Oct. 4, 1960      B. N. PALM      2,954,857
TRANSMISSION MECHANISM OF THE FLUID SHEAR TYPE
Filed Jan. 3, 1958      2 Sheets-Sheet 1
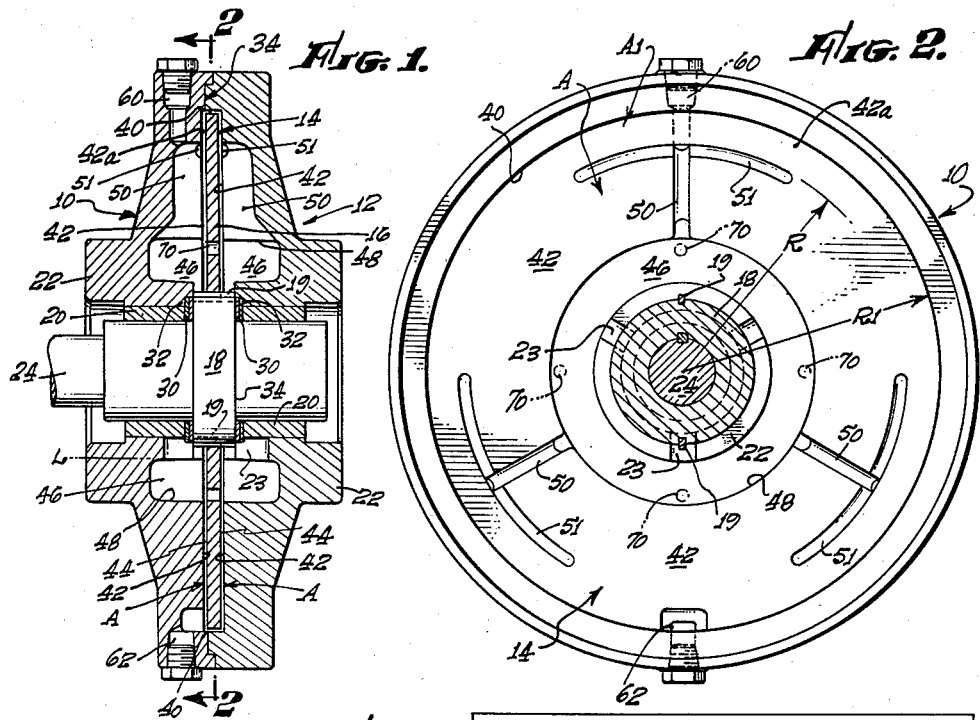
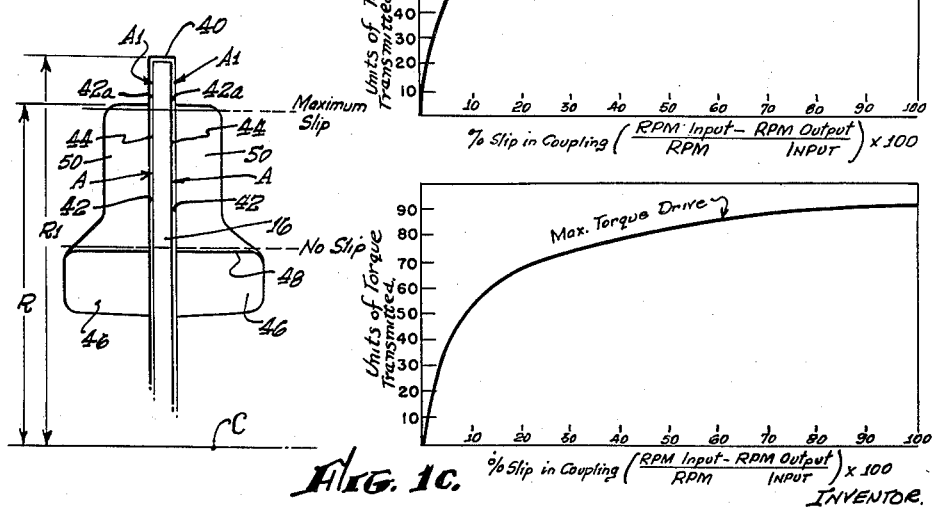
INVENTOR.
BERNHARD N. PALM,
By Burdew & Lewis Oct. 4, 1960     B. N. PALM     2,954,857
TRANSMISSION MECHANISM OF THE FLUID SHEAR TYPE
Filed Jan. 3, 1958     2 Sheets-Sheet 2
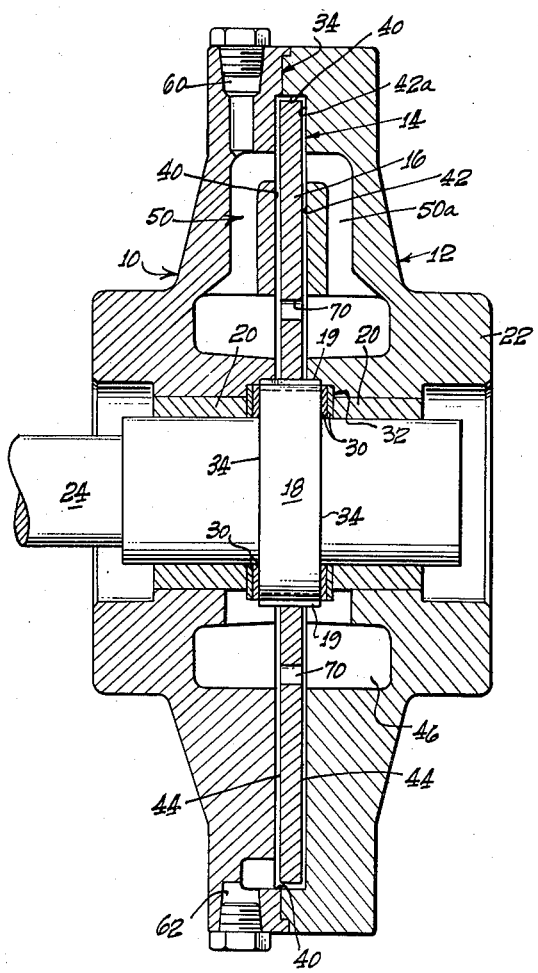
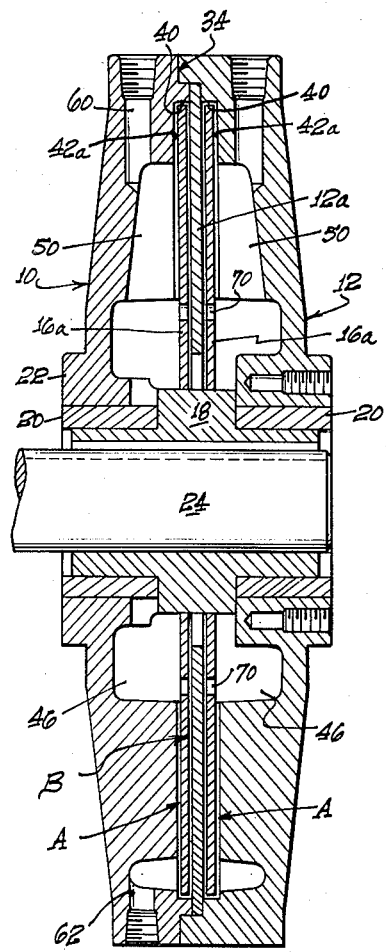
INVENTOR.
BERNHARD N. PALM,
By Bakelew & Jewis

United States Patent Office 2,954,857
Patented Oct. 4, 1960

2,954,857

TRANSMISSION MECHANISM OF THE FLUID SHEAR TYPE

Bernhard N. Palm, Newport Beach, Calif., assignor to Electra Motors, Inc., Anaheim, Calif., a corporation of California Filed Jan. 3, 1958, Ser. No. 707,029

10 Claims. (Cl. 192—58)

This invention relates to improvements in a type of fluid shear transmissions wherein the transmitted torque varies as a function of the slip between the driving and driven elements. The improvements of the invention include, among other things, the design and arrangement of the driving and driven elements to enable them to be maintained during operation in fixed spatial relation to each other, with no variation in spacing due to imbalances of fluid pressures; and, generally, the extreme simplification of design, reduction in cost, and uniformity and reliability of operation.

In a previous fluid shear transmission, the spaced opposing active driving areas are the opposed surfaces of disks centrally mounted on the driving and driven members, respectively. Varying unbalanced pressures on opposite sides of those disks cause disk flexure, resulting in variations of spacing and thus in uncontrolled variations of transmitted torque. As will be explained, the present invention completely overcomes that deficiency and greatly simplifies the whole transmission structure.

In a typical and illustrative form of the present invention the disk member is enclosed within the other member which is in the form of a rigid housing rotatable relative to the disk member. In such an illustrative form, the active driving faces are the opposite faces of a disk, each opposed by spaced faces of the rigid housing. Pressures on the disk, as well as on the housing, are, by this arrangement, balanced; eliminating distortion and variation of spacing. And the structure is also greatly simplified.

These and other objects and accomplishments of the invention, will be best understood from the following descriptions of presently preferred illustrative embodiments shown in the drawings, in which:

Fig. 1 is a longitudinal central section of one typical embodiment;

Fig. 1a is a schematic illustrating operation;

Figs. 1b and 1c are diagrams showing typical performance curves;

Fig. 2 is a section taken as indicated by line 2—2 on Fig. 1;

Fig. 3 is a section similar to that of Fig. 1, showing a modification; and

Fig. 4 is a similar section showing another modification.

Referring first to Figs. 1 and 2; a housing is composed of two substantially identical parts 10 and 12, secured together in rigid and fluid tight relation by suitable means, not shown. In the housing as thus composed there is an annular cavity 14, within which the circular disk 16 rotates with its opposite faces in spaced relation to certain wall surfaces of the cavity, as explained below. Disk 16 is rotationally fixed on a hub 18 (see below) which hub is journaled in bearing sleeves 20, of any suitable type, mounted in the hub portions 22 of the two housing halves 10 and 12. Shaft 24 drives, or is driven by, hub 18. In such an arrangement the shaft may carry the housing. In a typical design hub 18 is rigidly mounted on shaft 24, in effect integral with it. The drive to or from the housing is taken off in any desired manner; for example, through a flange attached to hub 22 of housing half 12. Regardless of how hub 18 is supported and driven, and of how the drive is applied to or taken off the housing, the housing is freely rotatable, on the axis of hub 18 and disk 16, relative to the disk.

The housing, and its cavity surfaces may be held in fixed axial position relative to the disk by suitable end thrust arrangements. As an example, suitable end thrust rings are shown at 30 located between housing shoulders 32 and hub shoulders 34. These rings also act to prevent leakage of fluid from the housing cavity around the hub. If the disk is rigidly mounted on the hub, these end thrust rings may perform the function of fixedly spacing the opposed surfaces of the disk and housing. But, although the disk may be rigidly mounted on the hub, preferably it is splined to it, by splines or keys such as indicated in Fig. 1 at 19. The disk is then held in its proper spaced relation by the opposing balanced pressures on its opposite faces.

To insure accurate concentricity between the two housing halves, a fluid tight peripheral joint is formed as shown at 34. Other than at this joint formation, the halves are duplicates in all their functional formations. Fig. 2 shows an inner facial view of housing half 10. In all functional formations that view also applies to the half 12.

As thus shown in the drawings, each half contains an essentially duplicate part of the cavity 14. That cavity in each half has an outer active part lying within and outwardly bounded by the peripheral shoulder 40 and having a flat radial wall surface 42 closely spaced in parallelism to the opposite faces 44 of disk 16. Immediately surrounding the hub portions of the body is an annular fluid reservoir 46. The reservoir parts of the cavity are sunk into the opposed faces of the halves much deeper than are the active cavity parts, as clearly shown in Fig. 1. The line at 48 indicates the circumferential delimitation between reservoirs 46 and the active outer annular spaces A between the radial faces 42 and disk faces 44. Along that whole line of delimitation—the outer boundary of the reservoirs and the inner boundary of active spaces A—those spaces are in communication with the reservoirs.

Leading outwardly from reservoirs 46 is a passage means consisting preferably of a plurality of passages (here shown as three). In Figs. 1 and 2 those passages are shown as slots 50 sunk into the housing halves beyond the cavity surfaces 42. These slots at their inner ends are in open communication with the reservoirs, and their outer ends are located on a circle at a radius indicated as R in Figs. 1a and 2, from the central axis C. Radius R is less than radius R1 of the shoulder 40 that defines the outer limit of active faces 42. Each active face 42 thus has an outer continuous annular area 42a unbroken by the passages 50. The circumference of disk 16 is spaced slightly inwardly of the delimiting shoulder 40 of surfaces 42. Thus the opposite faces 44 of the disk are in spaced parallel opposition to the whole of active surfaces 42, including the outer annular areas 42a and the areas inward of that annular area lying between passages 50 and inwardly delimited by the reservoirs at 48. A typical dimension of that spacing is 0.020 inch. The peripheral spacing at shoulder 40 may also preferably be the same; although it may be more. Circumferential grooves such as shown at 51 in Figs. 1 and 2 leading from the outer ends of passages 50 may be used, if desired, to facilitate the fluid movements herein described.

Various fluids may be used in the described transmission. At present silicon fluids are preferred because of their approximately constant viscosity under changing temperature, and their chemical stability. The viscosity chosen may range from fifty to one thousand centistokes, depending on the amount of power to be transmitted. Figs. 1 and 2 show an actual operating transmission approximately to scale; the dimensions may be scaled by taking shaft 24 to be three-quarters of one inch in diameter. A transmission of that size will transmit, with the driving shaft rotating at 1750 r.p.m., a range of power from approximately ¼ H.P. to ¾ H.P., depending on the chosen fluid viscosity.

The housing is charged with the amount of fluid that will satisfy the operating conditions now to be described. In the design here shown, that is satisfied by charging the stationary transmission up to about the level indicated L on Fig. 1. Suitable filling and draining openings are shown at 60 and 62.

The slots indicated at 23 in Figs. 1 and 2 allow fluid to drain down and contact the journals when the housing comes to rest, to provide additional lubrication for the journals; silicon fluid being a good lubricant.

In operation, fluid in the reservoirs 46 and in passages 50 rotates essentially with the housing, being but little influenced in rotational speed by the disk. Fluid in the spaces between the disk faces 44 and housing faces 42 rotates at a speed approximately midway between the rotational speeds of the disk and housing.

Assume first that the disk is the driving member rotating at constant speed and that the driven housing is standing still; a theoretic condition at the start of driving the housing from the disk and the condition of maximum slip between disk and housing. Under this condition fluid is thrown outwardly by the rotating disk to fill the annular spaces A1, lying outside the radius R. With those spaces filled, any additional fluid thrown outwardly by the rotating disk is returned to the reservoirs through the stationary passages 50. The spaces A1 under this condition contain fluid from the outer periphery at 40 inwardly approximately to the radius R, or to the radial level denoted "Maximum Slip" in Fig. 1a. The remainder of the fluid is in passages 50 and the reservoirs, standing essentially still rotationally and subjected to essentially no centrifugal force tending to throw it out. At the start of driving the housing the torque is that transmitted by fluid shear in the outer annular spaces A1 only.

As the rotational speed of the housing increases, the increasing centrifugal force on the fluid in passages 50 increases, and forces fluid from the outer end of those passages into the active space A to progressively decrease the inner radius of the fluid in that space. The fluid in that space, as stated before, rotates at a speed intermediate the speed of the disk and that of the housing and is subjected to a corresponding centrifugal force. At any intermediate housing speed the inner radius of fluid in active spaces A is that at which the centrifugal force on the fluid in those spaces balances the centrifugal force on the fluid in the more slowly rotating passages 59. Thus, as the rotating speed of the body and the fluid in those passages increases, the inner radius of the fluid in active spaces A decreases. That continues until, when the housing reaches the full disk speed, the inner radii of fluid in the housing passages and in the active spaces are equal, with centrifugal forces in balance on those two bodies of fluid. That takes place regardless of the total amount of fluid in the transmission. If the fluid volume is just enough to fill the active spaces and passages 50 outwardly from the outer boundary 48 of the reservoirs, the balance at full housing speed places the inner radius of both fluid bodies at that boundary—at the line designated "no slip" in Fig. 1a. If the total fluid volume exceeds that, the excess simply revolves against the outer wall 48 of the reservoir in communication with both the active spaces A and passages 50, and therefore does not disturb the balance.

At maximum rotational housing speed—no slip between the driving disk and the housing—all the fluid is rotating at the full driver speed. The inner level of the fluid in the whole of the spaces A and in the passages 50 then stands preferably at about the outer delimiting circumference 48 of the reservoirs; at about the radial level indicated "No Slip" in Fig. 1a. Under this condition all of the fluid is preferably out of the reservoirs. Any excess of fluid would simply remain in the outer parts of the reservoirs and be inactive.

At "No Slip" the transmitted torque is zero, because the fluid in the active spaces between the faces of the disk and housing is not in shear between those two parts that then have no relative movement. At maximum slip the transmitted torque is basically controlled by the radial width of outer active spaces A1—by the relative radial width of faces 42a.

The amount of transmitted torque at "Maximum Slip" (housing stationary) depends on the radial width of the spaces A1 outside the outer ends of passages 50. By decreasing the radius of those outer ends that torque is increased. If that radius is increased to the point where the outer ends of 50 are at the outer periphery of the disk and housing surfaces 44 and 42, the torque transmitted at "Maximum Slip" approaches zero.

The curve in Fig. 1b shows the torque transmitted through the range of slip when the disk is the driving member. Used in this manner, the transmission is a torque limiting drive.

If, on the other hand, the housing is the driving member, rotating at constant speed, the fluid is, at all times, located in the active spaces A and passages 50 outward of the delimiting line 48. The torque transmission, in terms of slip, is then shown by the curve in Fig. 1c. Used in this manner, the transmission is a maximum torque drive.

Due to the fact that fluid actions on opposite faces of both the disk and the housing are the same, fluid pressures on those opposite faces are balanced and no differential pressures tend to bend or distort either the disk or the housing and change the active clearances. If slight differences in pressures arise from slight inaccuracies of duplication of the two halves of the housing, and which may occur on rapid changes of transmitted torque, the peripheral passage at 40 around the disk edge tends to equalize pressure differences. (The passage at 40 may have the same clearance as the active spaces A, and thus add its area to the "Maximum Slip" annular spaces A1. Or, its clearance may be more, to have more equalizing effect.) And a series of openings through the disk, as shown at 70, located at about the radius of the outer reservoir delimitation 48, is very effective in equalizing incidental differential pressures. This balance of pressures keeps the disk equally spaced from the housing faces, and eliminates the necessity of high accuracy in machining and assembly that would be required if the disk were axially fixed on its hub and the hub held against axial movement.

From what has been said it will be apparent that the passages 50 need not be in the form of slots open to active spaces A throughout their lengths. They need only be in communication with the reservoirs at their inner ends and with active spaces A at their outer ends. It is the centrifugal force on the fluid at the outer ends of the slots that forces fluid from them into spaces A. Fig. 3 illustrates the indicated modification, where the passages 50a have inner and outer communications only at their ends. The other parts are the same as in Fig. 1 and are given the same numerals.

Fig. 4 shows another modification in which the active driving surface area is multiplied, in comparison to Fig. 1, by utilizing multiple disks on the shaft, here shown as two. Here, two disks 16a are carried on hub 18 in spaced relation, with a disk 12a between them. Disks 16a may be mounted on the hub in either manner described in connection with Fig. 1. Disk 12a is rigidly peripherally mounted in housing 12 by being clamped between the housing halves. Each housing half is the same as described for Fig. 1, with reservoir 46, slots 50 and active surface 42 including the unbroken annular face 42a outside the outer ends of the slots. The outer faces of disks 16a are spaced from the active housing faces as in Fig. 1, and the inner faces of the disks 16a are similarly spaced from the opposite opposed faces of disk 12a. The peripheral edges of the disks 16a are spaced from the outer shoulder boundary 40 of the housing cavities as in Fig. 1; and both disks may also have the openings 70 to facilitate equalization of pressures in spaces A and B. The peripheral spaces at 40, and openings 70, provide for free fluid passage between the active spaces A at the outer faces of the disks 16a and the active spaces B betwen disk 12a and disks 16a.

The functional performance is in substance the same as in Fig. 1. Fluid in the active spaces B rotates at the same angular velocity as in the active spaces A, while fluid in the reservoirs and slots 50 rotates essentially at the speed of the driven member. Spaces A and B being in intercommunication, the radial level of fluid in B is at all times the same as that in A. The action is thus in substance the same as in Fig. 1; and the fluid actions on opposite faces of each of the three disks being the same, pressure balances are maintained on them as well as on the housing.

I claim:

1. A fluid shear transmission comprising in combination driving and driven members relatively rotatable about a common axis, one of said members being in the form of a rigid housing enclosing the other, the enclosed member having opposite faces radially continuous from a predetermined radius outwardly to its periphery, and the housing having rigid and at least partially radially continuous faces spacedly opposing the faces of the enclosed member from said predetermined radius outwardly to the periphery of the enclosed member, said spacings forming active spaces for a fluid in shear, one of said members having fluid reservoir spaces at each of its faces, the inner boundaries of said reservoir spaces being near the rotational axis and the outer boundaries substantially coinciding with said predetermined radius, so that said reservoir spaces directly communicate with said active spaces at said predetermined radius, and one of said members having fluid passages, in addition to the spaces between said faces, in communication with and extending radially outwardly from the reservoir spaces and communicating at their outer ends with the active spaces between the driving and driven members.

2. The combination defined in claim 1 and in which the said housing faces are inner faces of the housing walls.

3. The combination defined in claim 2 and in which the enclosed member is in the form of a single disk.

4. The combination defined in claim 1 and in which the enclosed member is in the form of a single disk.

5. The combination defined in claim 1 and in which said passages are in the form of grooves.

6. The combination defined in claim 5 and in which the points of communication at the outer end of said passages are located radially inwardly of the outer peripheral boundary of said active spaces.

7. The combination defined in claim 1 and in which the points of communication at the outer end of said passages are located radially inwardly of the outer peripheral boundary of said active spaces.

8. The combination of claim 1 and in which the enclosed member is in the form of a single disk with flat opposite faces, the housing faces are flat inner faces of the housing walls directly spacedly opposing the opposite faces of the disk, the reservoir spaces are formed in the housing, and in which said passages are in the form of grooves sunk into the housing faces and have their points of communication at their outer ends located radially inwardly of the outer peripheral boundary of said active spaces.

9. The combination defined in claim 1 in which the enclosed member comprises an assemblage of a plurality of spaced-apart disks with opposite faces of the assemblage spacedly opposing the said housing faces to form active spaces for a fluid in shear, and including also disk means between the spaced-apart disks and presenting opposite faces to the adjacent faces of said spaced-apart disks to form further active spaces for a fluid in shear.

10. The combination defined in claim 9, in which the housing faces are inner faces of the housing walls, the reservoir spaces are formed in the housing, and in which said passages are in the form of grooves sunk into the housing faces and have their points of communication at their outer ends located radially inwardly of the outer peripheral boundary of said active spaces.

References Cited in the file of this patent

UNITED STATES PATENTS

| | | |
|---|---|---|
| 2,629,472 | Sterner | Feb. 24, 1953 |
| 2,706,547 | Ranzi | Apr. 15, 1955 |
| 2,743,792 | Ransom | May 1, 1956 |

FOREIGN PATENTS

| | | |
|---|---|---|
| 53,057 | France | Sept. 18, 1944 |